United States Patent [19]

Narukawa et al.

[11] Patent Number: 5,663,013
[45] Date of Patent: Sep. 2, 1997

[54] BATTERY WITH A SPACER BETWEEN THE ELECTRODE GROUP AND THE COVER

[75] Inventors: Satoshi Narukawa, Sumoto; Toru Amazutsumi, Tsuna-gun; Hideki Fukuda; Yasuhiro Yamauchi, both of Sumoto, all of Japan

[73] Assignee: Sanyo Electric Co., Ltd., Osaka, Japan

[21] Appl. No.: 657,936

[22] Filed: May 30, 1996

[30] Foreign Application Priority Data

May 31, 1995 [JP] Japan .................................. 7-134104

[51] Int. Cl.$^6$ .................................................. H01M 2/02
[52] U.S. Cl. ........................... 429/164; 429/186; 429/208; 429/211
[58] Field of Search ...................... 429/130, 163, 429/164, 121, 170, 175, 177, 186, 94, 178, 211, 208

[56] References Cited

U.S. PATENT DOCUMENTS

| | | |
|---|---|---|
| 4,025,702 | 5/1977 | Nishimura et al. ............... 429/164 X |
| 4,048,389 | 9/1977 | Bubnick et al. .................. 429/164 X |
| 4,049,882 | 9/1977 | Beatty ................................. 429/94 |
| 4,654,963 | 4/1987 | Sugalski .......................... 29/623.1 |
| 5,043,235 | 8/1991 | Seefeldt et al. ................. 429/122 X |
| 5,238,757 | 8/1993 | Suzuki et al. .................... 429/161 X |

Primary Examiner—Anthony Skapars
Attorney, Agent, or Firm—Wenderoth, Lind & Ponack

[57] ABSTRACT

The battery of the present invention includes a case, an electrode group introduced into the case and a cover sealing the open side of the case. The cover has a battery electrode, an insulation panel, spacers, and a cover tab, fixed thereto. The battery electrode and the cover tab are electrically welded, and are insulated from the cover. The spacers and the insulation panel are made of an insulating material. A connection opening is formed between the introduction of the spacers and enables welding material to weld the cover tab to the electrode group.

19 Claims, 7 Drawing Sheets

BATTERY WITH A SPACER BETWEEN THE ELECTRODE GROUP AND THE COVER

BACKGROUND OF THE INVENTION

The present invention relates to a battery with a spacer member mounted between an electrode group and a cover to prevent the slippage out of position of the electrode group inside a case.

A battery needs a structure preventing the slippage out of position of the electrode group mounted inside the case, because if the electrode group inside the case slips, the cover tab fixed on the inner face of the cover enters into contact with the positive and negative electrode groups resulting in an internal short circuit. As a structure for avoiding this inconvenience, the open side of the case is set, the internal diameter is narrower and a cylindrical spacer structure is adopted between the electrode group and the cover. It is impossible to proceed by setting one part of the case for all batteries. For example, it is impossible to set the corner of the case for a prismatic type battery.

Figure 1:
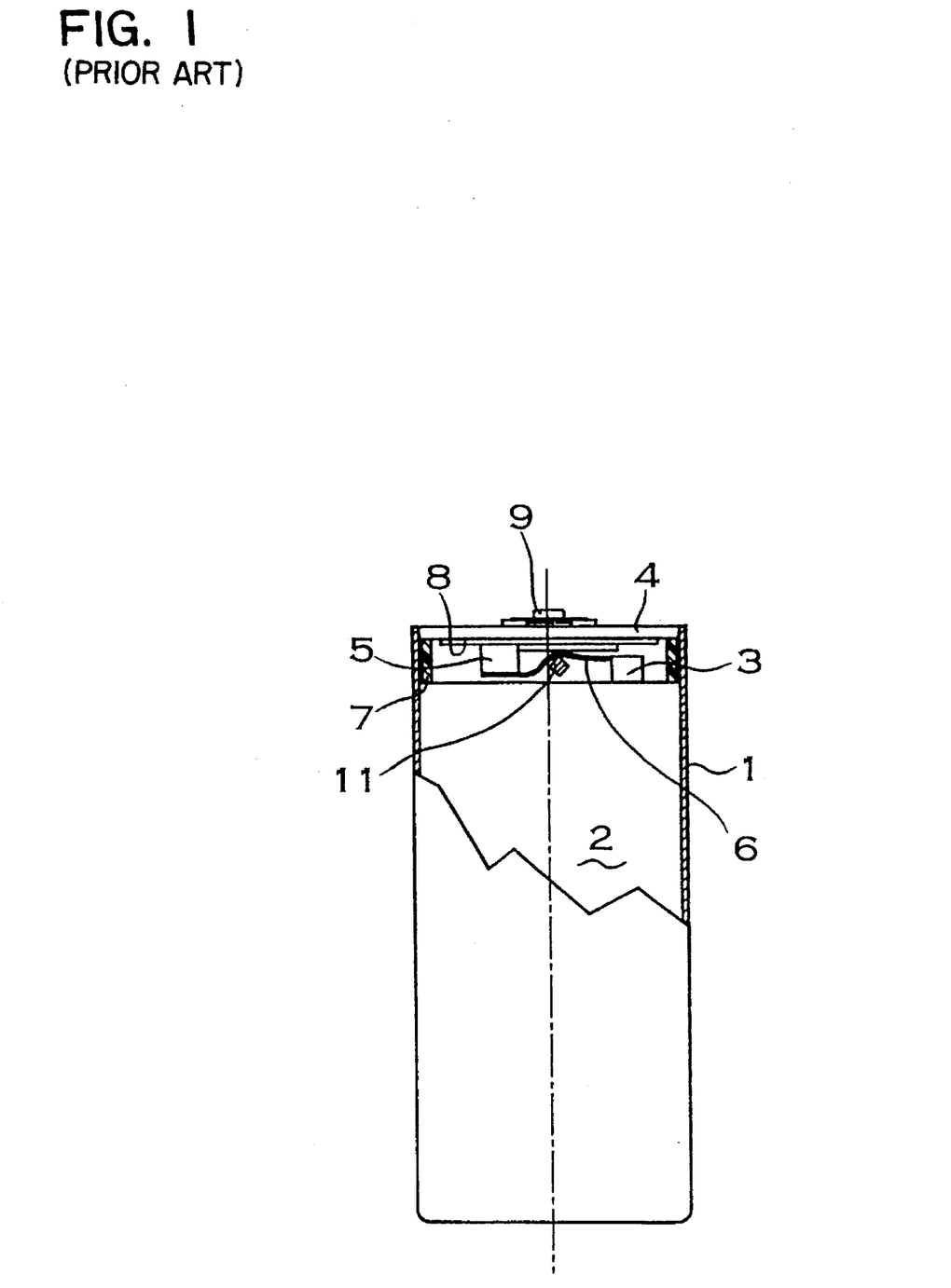
FIG. 1 is a cross-section view of a prior art battery.
Figure 2:
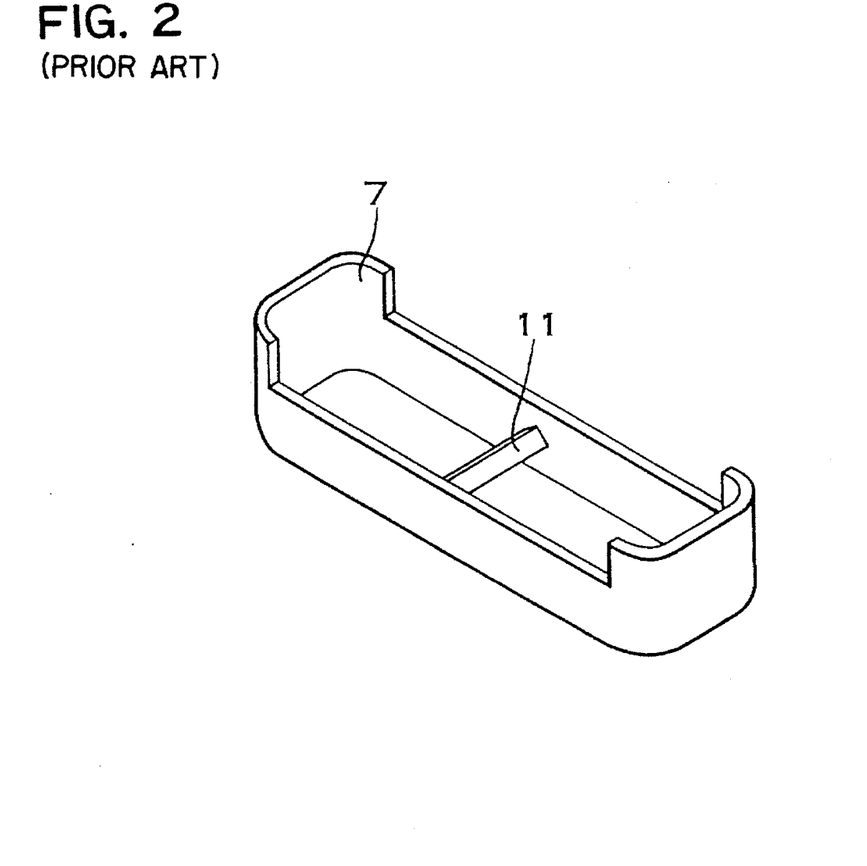
FIG. 2 is an oblique view of a spacer of the prior art battery.

In the batteries with a case unable to be set, a spacer is placed between the electrode group and the cover. FIG. 1 is a section view showing a battery mounted with a spacer. In this battery, to prevent the slippage out of position towards the top of the electrode group 2, spacer 7 is placed at the open side of the case 1. As shown in the perspective view Of FIG. 2, the spacer 7 made of plastic is cylindrical so as to fit the inner face of the case. The cylindrical spacer 7 holds the electrode group down by its outer part, preventing it from going up.

Figure 3:
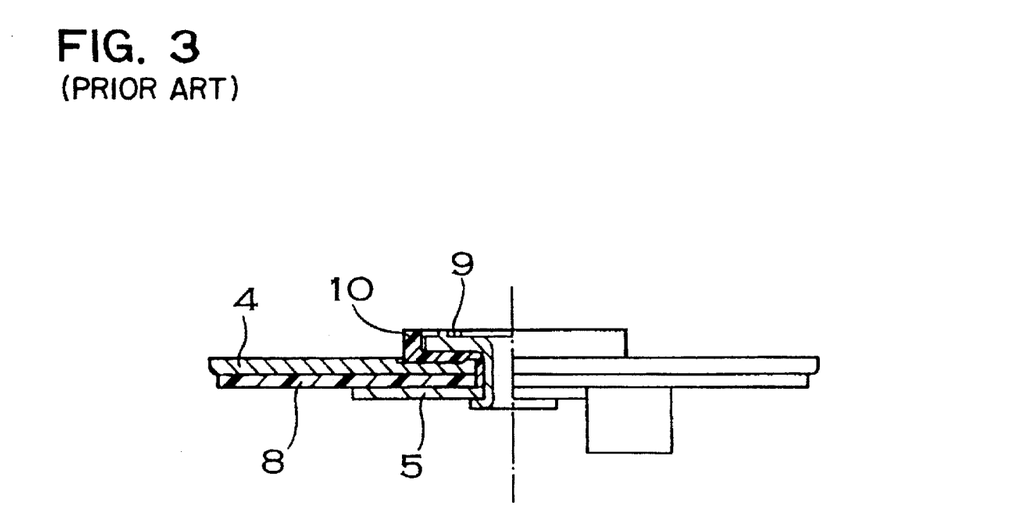
FIG. 3 is an enlarged cross-section view of part of a cover of the prior art battery.

Further, in the battery shown in FIG. 1, as shown in FIG. 3, a cover tab 5 made of a metal plate, inside the internal face of the cover 4, is fixed and insulated from the cover 4. The cover tab 5 is electrically connected to the battery electrode 9 that projects out of the upper face of the cover 4. Both the battery electrode 9 and cover tab 5 are insulated and fixed to the cover 4. To insulate the battery electrode 9, a gasket 10 has been inserted between the battery electrode 9 and the cover 4. To insulate the cover tab 5, a plastic insulator 8 has been interposed between the cover tab 5 and the cover 4.

As shown in FIG. 1., the cover tab 5 is connected at one end of a connecting tab 6 made from a thin metallic plate cut like a tape and at the other end of this connecting tab 6 is connected an electrode tab 3. The connecting tab 6, is bent at a right angle to facilitate the electric welding of the cover tab 5 and an electrode tab 3 at each end. One of the bent parts is electrically welded to the electrode tab 3 and the other to the cover tab 5. Further, to prevent the connecting tab 6 from lowering, a support 11 has been designed to connect the opposite sides of the spacer 7 and forms one unit with it. The connecting tab 6 is placed on top of the support 11. If there is no support 11 in the spacer 7, it becomes impossible to prevent the lowering of the long connecting tab 6. It is possible to shorten the connecting tab to prevent lowering, but it will be impossible to connect a short connecting tab to the cover tab. When connecting the connecting tab to the cover tab, the bent part of the connecting tab is lifted from the spacer and then connected. After having lifted the connecting tab from the spacer, and having connected it to the cover tab, the connection of the cover to the top of the spacer will cause the long connecting tab to assume a corrugated shape. For that reason, the connecting tab is lowered and the contact with the electrode group is made easier. The role of the support of the spacer is to prevent this inconvenience. When the cover is fixed to the spacer, the connecting tab becomes straight and because it cannot stick out of the upper part of the spacer, it cannot be connected to the cover tab.

Figure 4:
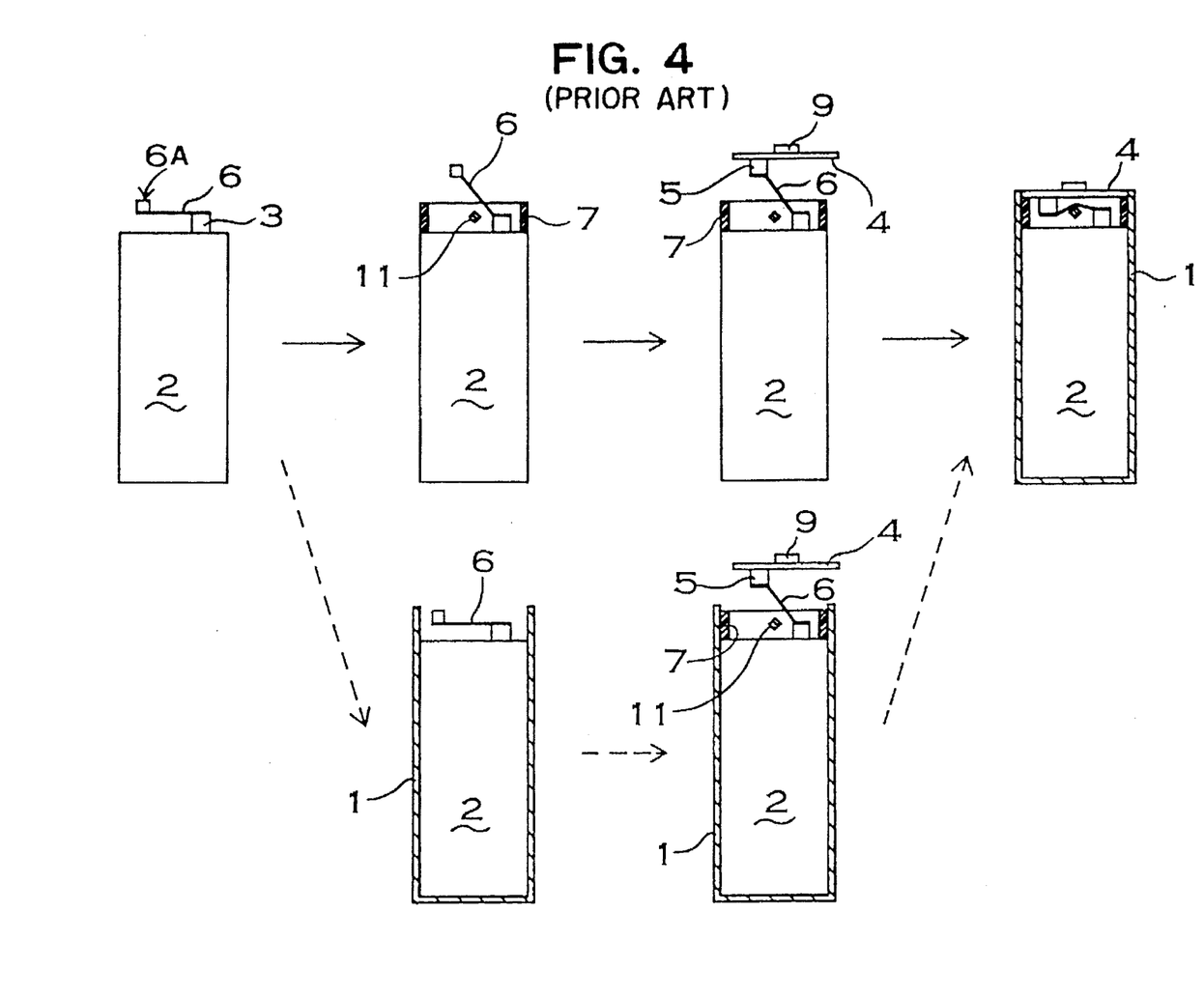
FIG. 4 is an outline cross-section view of the manufacturing process of the prior art battery.

The battery shown in FIG. 1 is manufactured as described hereunder through the process shown in full line in FIG. 4.

(1) Weld by electric welding one of the bent parts 6A of the connecting tab 6 to the electrode tab 3 of the electrode group 2, before inserting the electrode group in the case 1. When welding, hold the connecting tab 6 and the electrode tab 3 together from both sides using a welding electrode and, in this condition, send a strong electric current into the electrode tab 3 and the connecting tab 6. The strong electric current will weld by thermal welding the contact faces of the connecting tab 6 and the electrode tab 3.

(2) Place the cylindrical spacer 7 on top of the electrode group 2. Place on top of the support 11 built in the spacer 7, one side of the connecting tab 6 connected to the electrode tab 3. To connect the connecting tab 6 to the cover tab 5, pull up the other end of the connecting tab 6 from the spacer 7.

(3) Prepare the cover 4, fixed in an insulated condition with the cover tab 5 and the battery electrode 9, to be electrically connected. The structure of this cover 4 is manufactured by another process.

(4) Electric weld the other bent part 6A of the connecting tab 6 that sticks out from the spacer 7, to the cover tab 5 of the cover 4. At that moment too, hold together from both sides with the welding electrode the connecting tab 6 and the cover tab 5, and heat the same by running a strong current therethrough to perform the welding.

(5) Place together into the case 1, the electrode group 2, the spacer 7 and the cover 4.

(6) Fix to the open side of the case 1, the circumference of the cover 4 by laser welding. Through that process, the open side of the case 1 is sealed by the cover 4.

In the process shown in full line in FIG. 4, after having connected the connecting tab 6 to the cover tab 5, the electrode group 2 can be inserted into the case 1. In this method, as shown by the dotted line in FIG. 4, make sure to insert the electrode group 2 already connected to the connecting tab 6 into the case 1, then introduce the spacer 7 into the case 1 and it becomes possible to electrically weld the connecting tab 6 to the cover tab 5. As for the process shown by the dotted line, to be able to connect the connecting tab 6 to the cover tab 5, it is necessary to lift one end of the connecting tab 6 out of the spacer 7.

Because the prior art batteries shown in FIG. 1 used to be manufactured as mentioned above, it was difficult to insure good productivity in mass production. In particular, because the electric welding was performed while lifting one end of the connecting tab out of the spacer, the process of connecting the connecting tab to the cover tab takes much time. The spacer is placed between the electrode group and the cover and then, because the insulation panel is fixed between the cover tab and the cover, there are numerous processes for assembling the spacer to the insulation. Further, because it is necessary to connect the electrode group through a long connecting tab to the cover tab, the weak point is that the connecting tab used to come off easily due to shock or dropping.

The present invention has been developed to solve the problems described above. The most important object of the present invention is to achieve mass production of batteries at high productivity and low cost by reducing the number of parts.

Furthermore, another important object of the present invention is to reduce the percentage of defective products resulting from the production process and to produce batteries with superior antishock characteristics.

The above and further objects and features of the invention will more fully be apparent from the following detailed description and accompanying drawings.

SUMMARY OF THE INVENTION

The battery of the present invention is provided with the below mentioned construction to accomplish the above mentioned object. This battery is provided with a case, an electrode group inserted inside the case, a cover fixed at the circumference of the case blocking the opening of the case, a spacer member placed between the cover and the electrode group preventing the slippage out of position of the electrode group, a battery electrode insulated from and fixed to the cover, a cover tab placed at the inner face of the cover connected to this battery electrode, an insulation panel placed between the cover tab and the cover and provided to insulate the cover tab from the cover, the electrode tab being electrically connected to the cover tab.

Further, in this battery the spacer member is constituted by spacers fixed as one body at both ends of the insulation panel. Between the spacers in their complete form, a connection opening enables the connecting material insertion. The electrode tab and the cover tab are electrically connected at the connection opening of the insulation panel.

The battery of the present invention is made of an insulation material that can be manufactured so that the spacers and the insulation panel become one body. The spacers made as one body with the insulation panel are fixed in a predetermined position by the process of fixing the insulation panel to the cover. The spacer that is fixed to the case through the cover is correctly set at the exact predetermined position of the case by the insulation panel fixed to the cover. For that reason, like the spacer of the prior art batteries, there is no need for an external form that prevents the electrode group and cover from slipping out of position when being introduced into the face of the case. The spacer, built with a connection opening on both side surfaces fits correctly at the predetermined position of the case. Therefore, the battery of the present invention built with the spacers and the insulation panel formed as one body, besides reducing the number of parts, fixes the spacer at the predetermined position and provides a positive prevention of slippage out of position of the electrode group. Furthermore, the spacer built with the connection opening on both side surfaces enables the introduction of the welding material. For that reason, at the connection opening, the cover tab can be easily connected to the electrode tab of the electrode group or to the electrode tab through the connecting tab.

Figure 5:
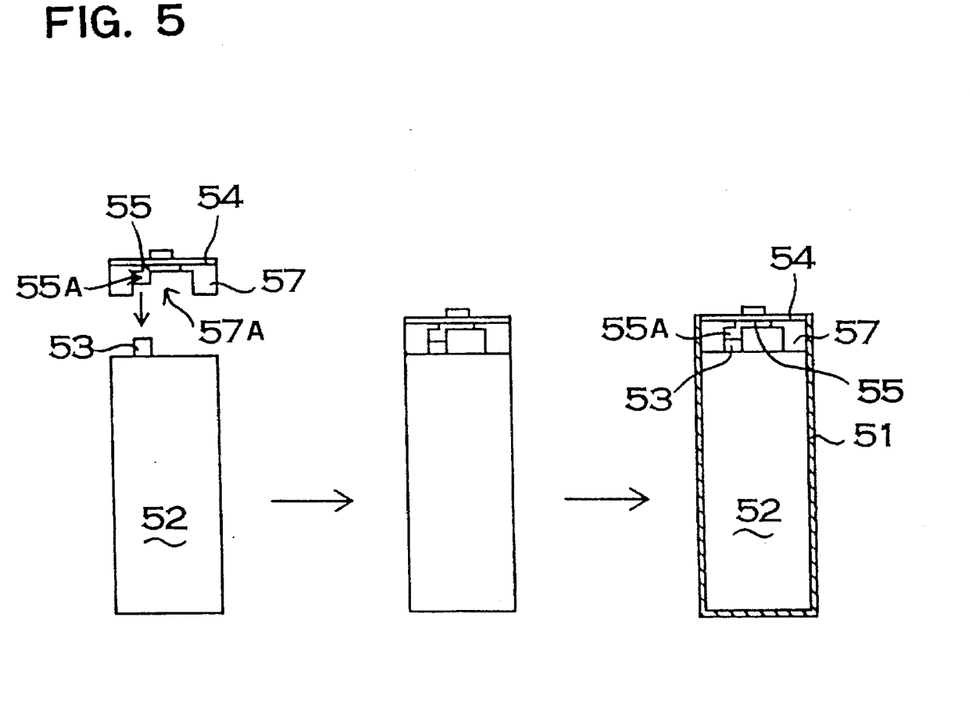
FIG. 5 is an outline cross-section view of the manufacturing process of a battery embodiment of the present invention.

The battery having the cover tab connected directly to the electrode tab, enables the production process shown in FIG. 5.

(1) Prior to the introduction into the case 51, directly connect the cover tab 55 to the electrode tab 53 of the electrode group 52. When connecting the electrode tab 53 and the cover tab 55, introduce the welding material from the connection opening 57A formed between the spacers 57. Having introduced the welding material from the connection opening 57A, because of the connection of the electrode tab 53 to the cover tab 55, it is not necessary to separate the spacers 57 from the electrode group 52. When the spacers 57 are tightly connected to the electrode group 52, connect the electrode tab 53 to the cover tab 55.

(2) Insert the electrode group 52 connected with the cover 54 into the case 51.

(3) Fix by laser welding the circumference of the cover 54 to the open side of the case 51. By that process the open side of the case 51 is blocked by the cover 54.

Figure 6:
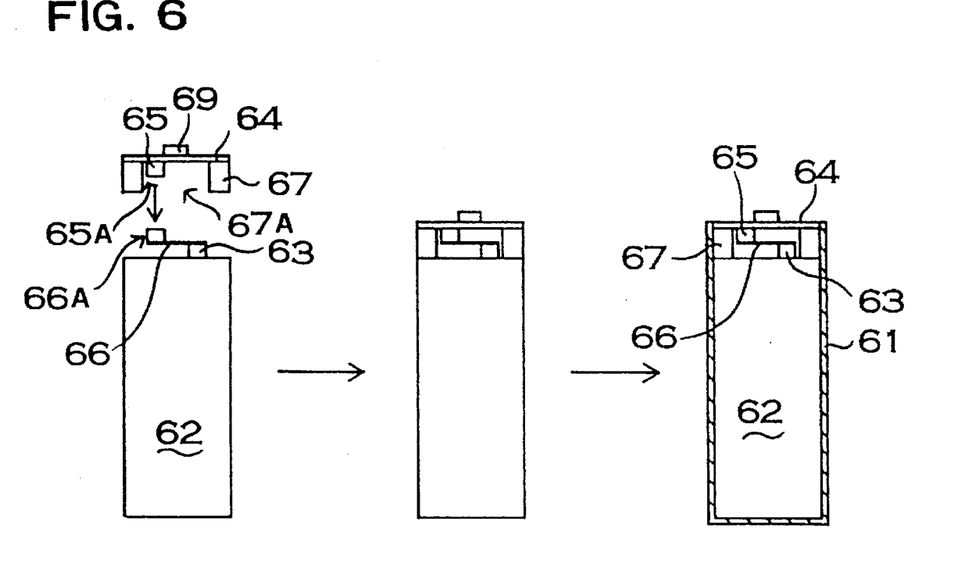
FIG. 6 is an outline cross-section view of the manufacturing process of another battery embodiment of the present invention.

Further, a battery having the cover tab connected to the electrode tab through a connecting tab is produced by the process shown in FIG. 6.

(1) Prior to the introduction into the case 61, the bent part 66A of the connecting tab is electrically welded to the electrode tab 63 of the electrode group 62.

(2) On the electrode group 62, place the cover 64 that fixes the spacers 67 built into one body with the insulation panel, introduce the welding material through the connection opening 67A formed between the spacers 67, and connect the connecting tab 66 to the cover tab 65. When connecting the connecting tab 66 to the cover tab 65 of the cover 64, because the welding material is introduced through the connection opening 67A placed on both sides of the spacers 67, it is not necessary to separate the spacers 67 from the electrode group 62. In the condition of tight connection of the spacers 67 to the electrode group 62, the connection of the connecting tab 66 to the cover tab 65 is made possible. For that reason, like the prior art batteries, it is not necessary to pull the connecting tab out of the top of the spacers, it is possible to use a connecting tab 66 whose length is the shortest straight distance between the electrode tab 63 and the cover tab 65 and to connect the electrode tab 63 to the cover tab 65.

(3) Introduce the electrode group 62 connected to the cover 64 into the case 61.

(4) Fix by laser welding the circumference of the cover 64 to the open side of the case 61. By this process, the open side of the case 61 is blocked by the cover 64.

The battery with the above mentioned structure of the present invention can be mass produced at a high productivity rate and with low cost because of the small number of parts. This is also because the battery of the present invention uses the spacers as one body with the insulation panel and fixes the spacers through the insulation panel, in the predetermined position of the cover.

Furthermore, in the battery of the present invention, the introduction of the welding material in the connection opening placed between the spacers enables an easy connection of the electrode tab or the connecting tab to the cover tab. In a battery of this structure using a connecting tab, and connecting the electrode tab to the cover tab, the shortest distance connection is made possible by a straight connecting tab. Then without using a connecting tab, it is possible to connect the electrode tab directly to the cover tab. In a battery of this structure, because there is no connecting tab, it is possible to precisely connect the cover tab to the electrode tab, and to improve considerably the resistance to shock. This is because, under a shock, the possibility of dislocation of the connecting tab is decreased. To compare the shock resistance ability, the present inventor has prepared 50 prior art batteries with the structure shown in FIG. 1 and 50 batteries of the present invention with a connecting tab directly connected to the cover tab, and performed a drop test. During the test the batteries have been dropped 10 times on a concrete surface from a height of 1.9 meters. As a result, 3 of the prior art batteries shown in FIG. 1 showed a dislocation of the connecting tab and none of the batteries of the present invention showed a dislocation of the electrode tab from the cover tab.

Further, in the battery of the present invention, the spacers and the insulation panel are not placed separately at the predetermined position of the case, the spacers form one body with the insulation panel. For this reason, the relative positions of the spacers and the insulation panel do not change. Because the insulation panel is fixed at the predetermined position of the cover, the spacers also are fixed at the predetermined position of the cover. In the prior art batteries where the spacers and the insulation panel are made of different materials, when the cover is inserted under pressure into the case, the position of the spacer is changed and the efficiency of the battery is depreciated. In the battery of the present invention, the dislocation of the spacers is prevented, the cover can be introduced under pressure into the case. For this reason, there is no defective product produced during the process of introducing the cover under pressure, and it is possible to raise the efficiency of the production of the battery. Incidentally, with the prior art battery shown in FIG. 1, 1.5 percent defective products were produced during the process of inserting the cover under pressure. Instead, with the battery of the present invention connecting the electrode tab directly to the cover, the percentage of defects created during the process of inserting the cover under pressure became as low as 0.3 percent.

DETAILED DESCRIPTION OF THE INVENTION

Figure 7:
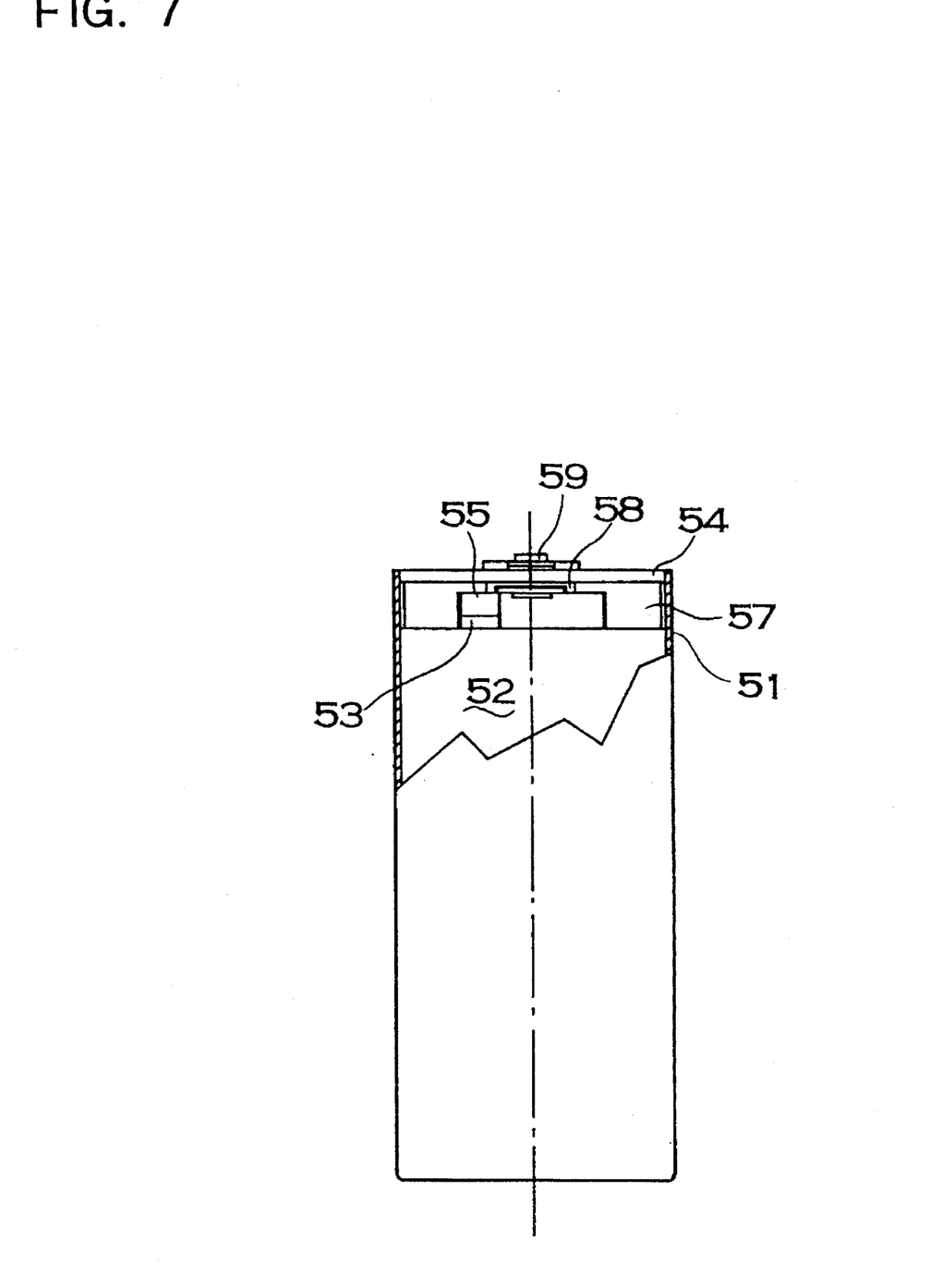
FIG. 7 is a cross-section view of the battery embodiment of the present invention.
Figure 8:
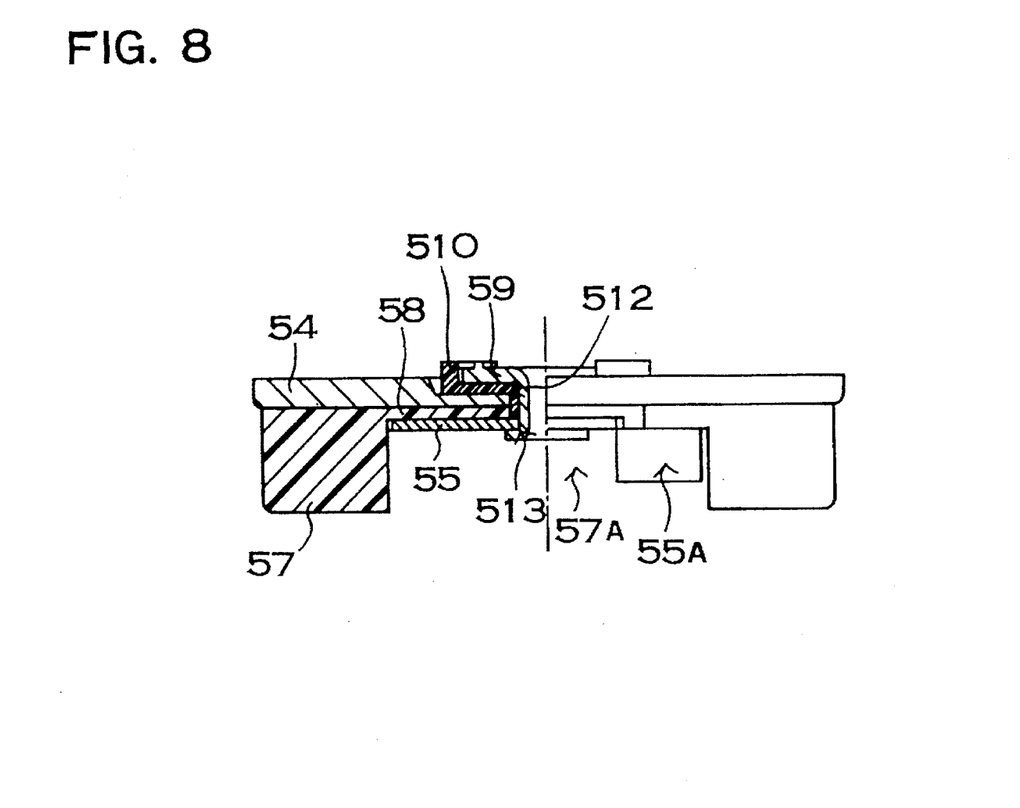
FIG. 8 is an enlarged cross-section view of a part of the battery shown in FIG. 7.
Figure 9:
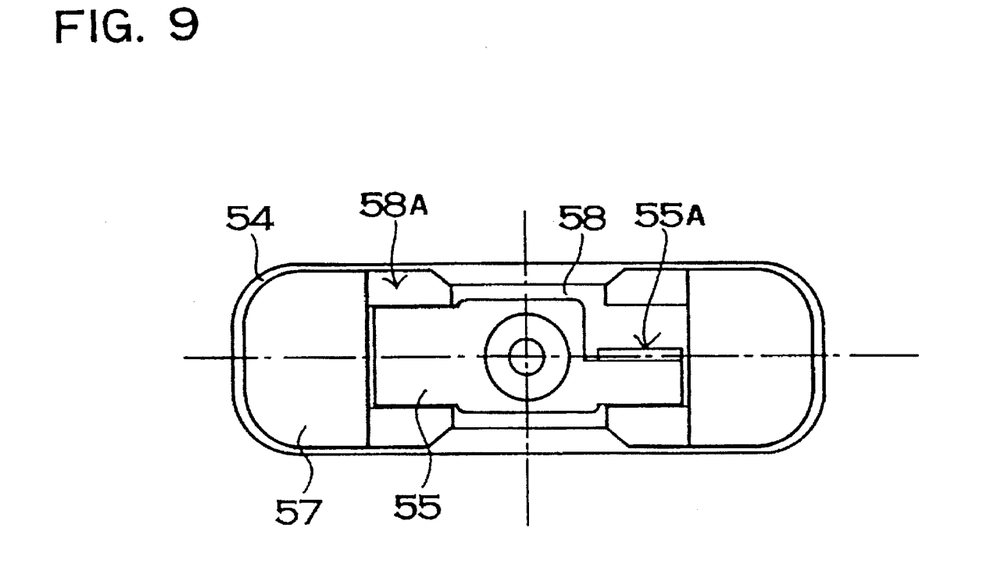
FIG. 9 is a view from below of a cover of the battery shown in FIG. 7.

FIG. 7 is a section view of a prismatic battery, FIG. 8 is a magnified section view of the part of a cover of the battery, and FIG. 9 is a bottom view of the cover. The battery shown in these views is provided with a case 51, an electrode group 52 inserted into the case 51, a cover 54 that blocks the open side of the case 51 sealing the circumference of the open side of the case 51, a spacer member constituted by spacers 57 placed between the cover 54 and the electrode group 52, that prevents the slippage out of position of the electrode group 52, a battery electrode 59 fixed to the cover 54, a cover tab 55 set on the inner side of the cover and connected to the battery electrode 59, and an insulation panel 58 placed between the cover tab 55 and the cover 54 to insulate this cover tab 55 from the cover 54.

The case 51 of a prismatic form is made of metal like iron, aluminum or the like. The base of the case 51 is closed and the upper part is open. In the prismatic battery shown in FIG. 7, for example, the case 51 can be set as the negative pole and the battery electrode 59 can be set at the center of the cover 54 as the positive pole. But it is also possible for the case to be set as the positive pole and the battery electrode of the cover to be set as the negative pole.

Placing a separator acting as insulation between the positive electrode strip and the negative electrode strip, the laminated electrode group 52 is wound in a spiral form, then is pressed into a form that can be placed into the case 51. The electrode of the outermost spiral of this electrode group 52 is electrically welded to the case 51. In the electrode group 52 many positive electrode strips and negative electrode strips are laminated with a separator and the outermost winding of the electrode strip can also be connected to the case 51. In the electrode group 52 laminating the electrode strip, the center of the electrode strip that is not connected to the case 51, is insulated by the separator so that it does not enter into contact with the case 51.

The electrode group 52, connecting independently and separately the positive electrode strip and the negative electrode strip, connects an electrode tab 53 to the electrode strip that is not connected to the case 51. The electrode tab 53 protrudes from the top of the electrode group 52 because it is connected to the battery electrode 59 which is fixed to the cover 54.

The cover 54 is made of a metallic plate. In the battery of the present invention the cover 54 is not connected and set to the open side of the case 51. The cover 54 is fixed along the open side of the case 51 by for example the method of laser welding or another method. The cover 54 welded to the case 51, is introduced without any gap between the inner face of the open side of the case 51. The outer face of the cover 54 and the inner face of case 51 have to be cut into shape so that there is no gap between the case 51 and the cover 54.

As shown in FIG. 8 and FIG. 9, the battery electrode 59 is fixed on the upper face of cover 54 and the cover tab 55 on the inner face of the cover 54. The cover tab 55 and the battery electrode 59 are made of metal, because they have to be electrically conductive. The battery electrode 59 is connected to the cover tab 55. The battery electrode 59 and the cover tab 55 are fixed and insulated from the cover 54. A gasket 510 is placed between the battery electrode 59 and the cover 54 to insulate the battery electrode 59 and fix it to the cover 54. The insulating panel 58 is placed between the cover tab 55 and the cover 54 to insulate the cover tab 55 from and fix it to the cover 54. The gasket is made from a plastic having excellent insulation characteristics.

Going through the cover 54, the battery electrode 59 is fixed at the center of the cover tab 55. To connect the battery electrode 59 to the cover tab 55, the lower end of the battery electrode 59 is introduced through a penetration hole 513 formed through the middle of the cover tab 55, the circumference of this interior end being fixed by setting to the cover tab 55. The battery electrode 59 and the cover tab 55, holding between them the gasket 510 and the insulating panel 58, are fixed to the cover 54. To prevent an electric short circuit between the battery electrode 59 and the cover 54, the cover 54 is designed with a battery electrode penetration hole 512 needed to introduce the battery electrode 59 while preventing any contact.

Figure 10:
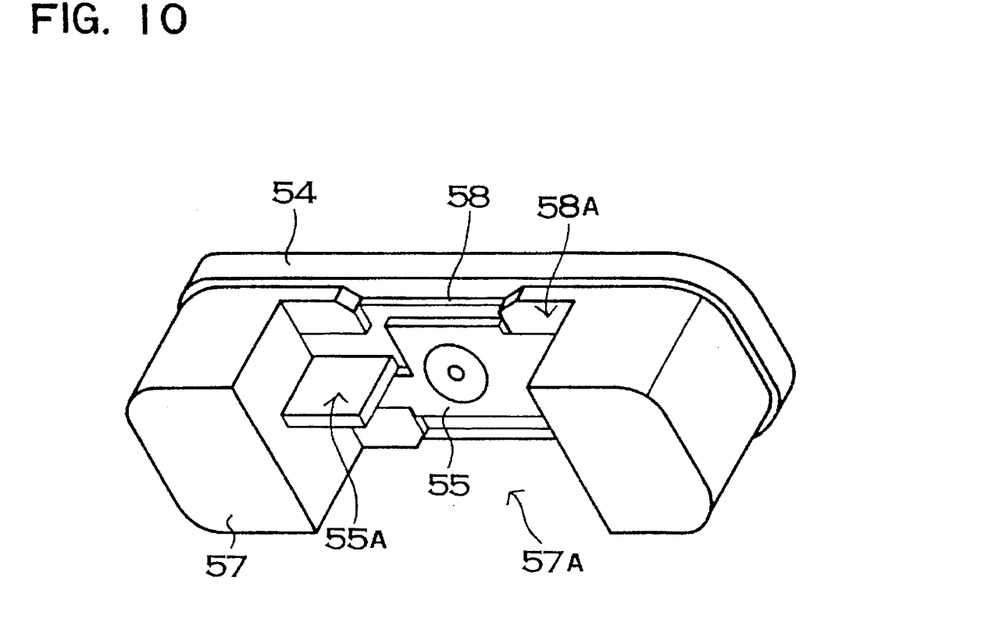
FIG. 10 is an oblique view from below of the cover of the battery shown in FIG. 7.

The insulation panel 58 insulating the cover tab 55, is shown in FIG. 10. This insulation panel 58 made of a shapable insulation material has been formed as one body with the spacers 57. This insulation material is made of plastics like polyethylene resin, nylon resin, polypropylene resin, etc. or inorganic materials like silica or alumina. As shown in FIG. 9, the outer circumference of the insulation panel 58 is designed slightly smaller than the outer circumference of the cover 54. The insulation panel 58 of that form enables easy introduction into the case 51 and also when welding the outer circumference of the cover 54 to the cover 51, the outer circumference of the insulation panel 58 does not burn because of the heat created during the process of welding the cover 54. Therefore, it is possible to weld the cover 54 to the case 51 without warping the insulation panel 58 that is made of plastic which easily warps under heat. The insulation panel 58 is fixed through the cover 54 at a given position of the case 51 because it is fixed at a given position on the cover 54. Therefore, even if there is a slight gap between the inner face of the case 51 and the outer circumference of the insulation panel 58, the insulation panel will not be incorrectly positioned. An insulation panel made of inorganic material can be formed with almost the same external face as the cover. This is because it does not warp when welding the cover to the case.

Further, the insulation panel 58 to fix the cover tab 55 at the given position is formed as one body with a stopper projection 58A for the cover tab that protrudes from the base. The stopper projection 58A, located near the four corners of the cover tab 55, is mounted on both sides.

Further, as shown in FIG. 10, the insulation panel 58 is designed as one body at both ends with the spacers 57. The spacers 57, positioned on top of the electrode group 52 as shown in FIG. 7, prevent the slippage out of position of the electrode group 52. Therefore, the spacers 57 are designed with a length so that their lower ends contact the upper face of the electrode group 52, or come close to the electrode group 52. To avoid the spacers 57 being disturbed when connecting the electrode tab 53 to the cover tab 55, there are spacers at both ends of the insulation panel 58 and, between the spacers 57 there is a connection opening 57A. If the width of the connection opening 57A is wide, the spacers 57 become small. On the contrary, if the spacers 57 are bigger, the width of the connection opening 57A is smaller. When connecting the electrode tab 53 to the cover tab 55, the connection opening 57A is designed with a width so that the welding material can be placed through both sides. The spacers 57 are designed with a size that prevents slippage of the electrode group 52 toward the top of the case.

If the spacers 57 are too small, the spacers 57 push against the electrode group 52 in a narrow area to prevent the slipping upwards. For that reason, the spacers 57 will press on a small part of the electrode group 52 and cause an abnormal stress against the electrode group 52. If the spacers 57 are large, the spacers 57 presses against the upper face of the electrode group 52 over a large surface, and there is no abnormal pressure on the electrode group 52. But as the spacers 57 get even larger, the connection opening 57A gets smaller. If the connection opening 57A gets too narrow, it becomes difficult to place the welding material between the cover tab 55 and the electrode tab 53. Thus, the sizes of the spacers 57 and of the connection opening 57A have to be designed so that the spacers 57 prevent the slippage out position of the electrode group 52 without undue strain, while allowing for easy introduction of the welding material into the connection opening 57A. As shown in FIGS. 8–10 almost half of the length of the insulation panel 58 is the connection opening 57A and the rest is the spacers 57.

The cover tab 55 is placed between the spacers 57 that are located on both ends of the insulation panel 58 and is cut in the form of a board that can be placed and fixed between the stopper projections 58A. The cover tab 55, to be able to weld the electrode tab 53, as shown in FIG. 8, or FIG. 10 is bent downwards at one end so as to constitute a panel portion and a welding piece 55A. Then, at the center of the cover tab 55, there is the opening of the penetration hole 513 used to connect the battery electrode 59. The battery shown in FIG. 7 is manufactured following the hereunder mentioned process shown in FIG. 5.

1) Prepare the cover 54 mounted with the battery electrode 59 and the cover tab 55. This cover 54 holds the gasket 510 and the insulation panel 58 with the battery electrode 59 and the cover tab 55. The battery electrode 59 is insulated from the cover 54 by the gasket 510, and the cover tab 55 is insulated from the cover 54 by the insulation panel 58.

2) The electrode tab 53 of the electrode group 52 is welded to the welding piece 55A of the cover tab 55 fixed to the cover 54. When welding the welding piece 55A to the electrode tab 53, the welding material is introduced into the connection opening 57A between the spacers 57. The welding material will hold the welding piece 55A and the electrode tab 53 on both sides, and make the connection.

When connecting the welding piece 55A of the cover tab 55 to the electrode tab 53, the lower surfaces of the spacers 57 are in contact with the upper surface of the electrode group 52. In other words, in the condition in which the spacers 57 are placed on top of the electrode group 52, the cover tab 55 is connected to the electrode tab 53.

3) Place the electrode group 52 and the cover 54 into the case 51. The cover 54, connected to the electrode group 52, is inserted into the open side of the case 51. The outer circumference of the cover 54 and the inner face of the case 51 are welded through a process of laser welding or another process.

Figure 11:
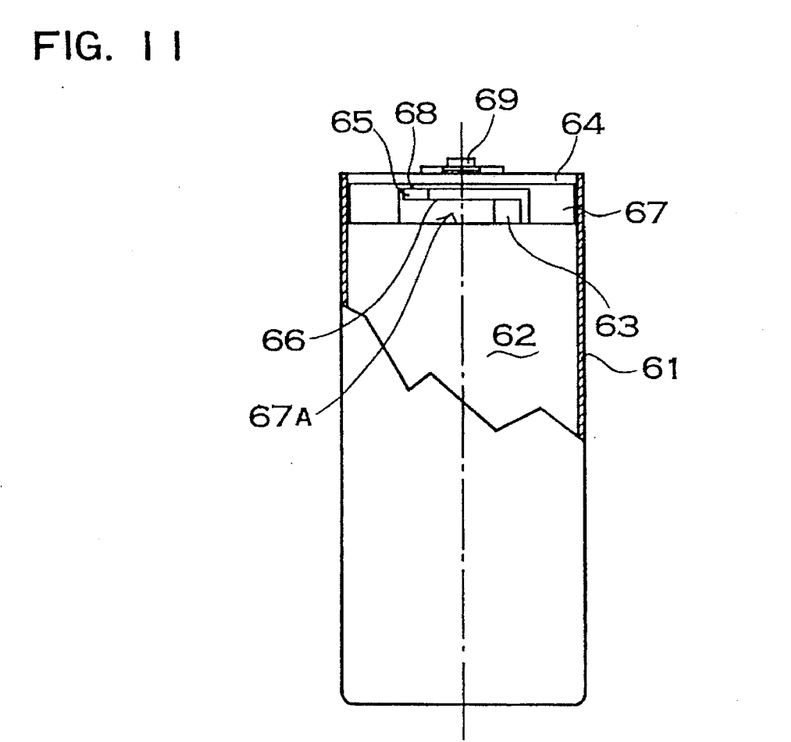
FIG. 11 is a cross-section view of another battery embodiment of the present invention.

In the battery shown in FIG. 7, the cover tab 55 is directly connected to the electrode tab 53. A battery of this type features a limited number of parts, a possibility of mass production at a high productivity rate and low cost and ideal antishock characteristics. But, in the battery of the present invention, it is not always necessary to connect the electrode tab directly to the cover tab. In the battery of the present invention as shown in FIG. 11, it is possible to connect a cover tab 65 through a connecting tab 66 to an electrode tab 63. This battery, except for the use of the connecting tab 66, is manufactured the same way as the battery shown in FIG. 7. The connecting tab 66 is cut from a metallic tape and bent at both ends to form bent parts 66A (see FIG. 6). In the battery shown in FIG. 11, the connecting tab 66 is built in like the prior art batteries but the length of the connecting tab 66 is completely different. When straight, the connecting tab 66 joins by the shortest distance the electrode tab 63 and the cover tab 65; because it is possible to connect the cover tab 65 without pulling the connecting tab 66 upwardly from spacers 67. The connecting tab 66, with the spacers 67 placed on top of the electrode group 62, is connected to the cover tab 65.

The battery mounted with the connecting tab 66 shown in FIG. 11 is manufactured following the hereunder mentioned process as shown in FIG. 11.

1) Prepare a cover 64, having the necessary insulation, the cover tab 65 and the battery electrode 69, to be electrically welded.

2) Connect one end of the connecting tab 66 to the electrode tab 63.

3) Placing the spacers 67 on top of the electrode group 62, connect the other end of the connecting tab 66 to the welding piece 65A. Introduce the welding material into the connection opening 67A to enable the connection of the connecting tab 66 to the welding piece 65A. The welding material holds and connects the welding piece 65A and the connecting tab 66 on both sides.

(4) Introduce the electrode group 62, connected with the cover 64, into the case 61, weld by the process of laser welding or another process the outer circumference of the cover 64 with the inner face of the case 61.

In the above mentioned process, one end of the connecting tab 66 is connected to the electrode tab 63 and then the other end of the connecting tab 66 is connected to the cover tab 65. It is not illustrated, but one end of the connecting tab 66 can be connected in advance to the cover tab and then it becomes possible to connect the other end of the connecting tab to the electrode tab 63. Thus, battery can be manufactured following the hereunder mentioned process.

1) Prepare a cover 64, having the necessary insulation, the cover tab 65 and the battery electrode 69.

2) Connect one end of the connecting tab 66 to the cover tab 65. When connecting the connecting tab 66 to the cover tab 65, introduce the welding material into the connection opening 67A.

3) Placing the spacers 67 on top of the electrode group 62, connect the other end of the connecting tab 66 to the battery tab 63. When connecting the connecting tab 66 to the battery tab 63, introduce the welding material into the connection opening 67A.

4) Introduce the electrode group 62 connected with the cover 64, into the case 61 and weld, by the process of laser welding or another process, the outer circumference of the cover 64 with the inner face of the case 61.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bound of the claims, or equivalents of such meets and bounds thereof are therefore intended to be embraced by the claims.

What is claimed is:

1. A battery comprising:
   a case having a first end and a second end, said first end being an open end;
   an electrode group mounted in said case;
   a cover fixed to and blocking said open first end of said case, said cover having an inner face and an outer face;
   an electrically conductive battery electrode fixed to and insulated from said cover, said battery electrode being exposed at least partially to an outside of said case;
   an electrically conductive cover tab mounted to said inner face of said cover and being electrically connected to said battery electrode;
   an insulator member interposed between said cover tab and said cover such that said cover tab and said cover are electrically insulated from one another;
   an electrically insulative spacer member interposed between said cover and said electrode group so as to prevent said electrode group from shifting position in said case;
   wherein said spacer member and said insulator member are formed as a single body; and
   wherein said spacer member has a connection opening through which said cover tab is accessible when said cover and said spacer member are mounted on said electrode group and said spacer member is directly contacted against said electrode group but before said electrode group, said cover and said spacer member are inserted into said case, to thereby allow said cover tab to be welded, through said connection opening, to said electrode group.

2. A battery as recited in claim 1, wherein
said electrode group has an electrode tab protruding therefrom; and
said cover tab is directly connected to said electrode tab.

3. A battery as recited in claim 1, wherein
said electrode group has an electrode tab protruding therefrom; and
said cover tab is connected to said electrode tab through a connecting tab.

4. A battery as recited in claim 3, wherein
said connecting tab is formed as a ribbon; and
said connecting tab has a length equal to a distance between said cover tab and said electrode tab.

5. A battery as recited in claim 1, wherein
said case comprises a prismatic case, and said second end thereof is a closed end.

6. A battery as recited in claim 1, wherein
said cover is welded about a periphery thereof to said open first end of said case.

7. A battery as recited in claim 1, further comprising
a plastic gasket held between said battery electrode and said cover.

8. A battery as recited in claim 1, wherein
said cover has a penetration hole formed therethrough; and
said battery electrode extends through said penetration hole.

9. A battery as recited in claim 1, wherein
said insulator member is made of polyethylene resin or nylon resin or polypropylene resin.

10. A battery as recited in claim 9, wherein
said single body formed by said insulator member and said spacer member has an outer shape which corresponds to, but is slightly smaller than, an outer shape of said cover.

11. A battery as recited in claim 1, wherein
said insulator member is made of inorganic material containing silica or alumina.

12. A battery as recited in claim 1, wherein
said single body formed by said spacer member and said insulator member is provided with a stopper projection for fixing said cover tab in position relative to said cover.

13. A battery as recited in claim 12, wherein
said cover tab has four corners; and
said stopper projection comprises four stopper projections located adjacent said four corners of said cover tab.

14. A battery as recited in claim 13, wherein
said cover tab comprises a panel portion and a welding piece bent at an approximately right angle relative to said panel portion.

15. A battery as recited in claim 11, wherein
said spacer member spans all or substantially all of a distance between said cover and said electrode group.

16. A battery as recited in claim 1, wherein
said spacer member comprises a pair of spacer portions spaced apart from one another along a lateral direction normal to a longitudinal direction from said first end to said second end of said case, said connection opening being defined by a space between said spacer portions.

17. A battery as recited in claim 16, wherein said connection opening occupies approximately one-half of a length of said spacer member in said lateral direction; and said spacer portions occupy approximately one-half of the length of said spacer member in said lateral direction.

18. A battery as recited in claim 1, wherein said cover tab comprises a panel portion and a welding piece bent at an approximately right angle relative to said panel portion;

said electrode group has an electrode tab protruding therefrom; and said welding piece of said cover tab is welded directly to said electrode tab.

19. A battery as recited in claim 1, wherein said cover tab comprises a panel portion and a welding piece bent at an approximately right angle relative to said panel portion;

said electrode group has an electrode tab protruding therefrom; and said welding piece of said cover tab is welded to said electrode tab through a connecting tab.

* * * * *